Patented Mar. 13, 1945

2,371,245

UNITED STATES PATENT OFFICE 2,371,245

PROCESS FOR THE MANUFACTURE OF PANTOTHENIC ACID

John Lee, Nutley, N. J., and Stephen D. Heineman, New York, N. Y.

No Drawing. Application October 16, 1941,
Serial No 415,214

5 Claims. (Cl. 260—534)

Our invention relates to an improved method for the manufacture of pantothenic acid, more especially of the alkali metal salts of pantothenic acid.

It is known to prepare pantothenic acid by melting together β-alanine or its sodium salt and α-hydroxy-β,β-dimethyl-γ-butyrolactone. The resulting pantothenic acid or the corresponding sodium salt are non-crystalline melts which cannot be characterized except by a biological assay.

In order to obtain a pure product, it is necessary to treat the melts further by such purifying methods as fractional distillation in high vacuum, chromatographic absorption, and the like. It is self-evident that the preparation of pantothenic acid in this manner is not advantageous.

Furthermore, the use of α-hydroxy-β,β-dimethyl-γ-butyrolactone is a serious disadvantage of the method. The lactone is a very hygroscopic, poorly characterized material. It occurs when prepared by the methods described in the literature as a plastic vaseline-like mass to which no uniform melting point has been ascribed. For instance, the M. P. is given as 55° C. by Glaser, Monathefte f. Chemie 25: 50; and as 75 to 80° C. by Carter, Journal of the American Chemical Society 63: 312, 1941. Non-uniform composition of the lactones produced by these various authors is the reason for this difference in melting points.

It is, therefore, an object of our present invention to provide a method for the preparation of pantothenic acid salts which yields chemically and physically uniform reaction products obtainable in crystalline form.

It is a further object of the invention to use stable, easily preserved, easily handled, well characterized butyrolactones which on reaction with salts of β-alanine yield the desired uniform pantothenic acid compounds.

It is also an object of our invention to develop a useful method by which these well characterized lactones can be condensed with β-alanine to form a pantothenic acid compound.

We have found that well-characterized derivatives of α-hydroxy-β,β-dimethyl-γ-butyrolactone, for instance, the α-acetoxy compound, can be substituted for the non-acetylated compound in the aforementioned fusion with β-alanine into pantothenic acid.

α-Acetoxy-β,β-dimethyl-γ-butyrolactone is a clear limpid liquid with a close boiling range and sharp refractive index which characteristics can be easily reproduced. The product is easily obtained by the acetylation of the corresponding non-acylated compound and simple fractional distillation.

Similarly other lower aliphatic acid derivatives can be used, as for example, propionyl or butyryl.

As another example the α-benzoxy-β,β-dimethyl-γ-butyrolactone is a well characterized crystalline substance with a melting point of 64.5° C. which is perfectly stable in air and can be stored without any special precautions. This as well as other substituted benzoyl derivatives, as for example, veratroyl, piperonyl, and anisoyl can be used to substitute the hydrogen atom of the α-hydroxy group.

When these α-acylated derivatives are fused with alkali metal salts of β-alanine in the manner described in the literature for the preparation of pantothenic acid using the non-acetylated butyrolactone, reaction products are obtained which on crystallization are found to be the alkali metal salts of the α-acylated pantothenic acid.

Thus when sodium alanine is fused at 100° C. with α-acetoxy-β,β-dimethyl-γ-butyrolactone, the reaction product after recrystallization from alcohol-ether is obtained in the form of white crystals which on analysis show the presence of one acetyl group. The white crystals on assay for pantothenic acid activity by testing the growth activity against Lactobacillus caseii show only a slight activity. On the other hand, when the product obtained was hydrolyzed with sodium hydroxide, the full activities of pantothenic acid are shown on biological test. Nevertheless, this method is undesirable for practical purposes because it requires the additional operation of hydrolysis in order to split off the acetyl group.

We have now made the surprising discovery that if the reaction between β-alanine and the α-acyloxy-β,β-dimethyl-γ-butyrolactones is carried out in solution which may be water free, the salts of pantothenic acid are directly obtained instead of the α-acyl-pantothenic acid salts, which were expected. These pantothenic acid compounds when tested chemically, physically and biologically correspond in all respects to pantothenic acids obtained by other methods.

Thus, our invention comprises admixing an alkaline solution of β-alanine with an α-acyloxy-β,β-dimethyl-γ-butyrolactone in substantially equimolecular proportions and in isolating directly from the solution without further chemical intervention salts of pantothenic acid.

The invention is illustrated by the following examples, without however being limited to the conditions described therein:

Example 1

1.98 gm. β-alanine are dissolved in 9.37 cc. 2.37 N sodium methylate at 40°. The solution is cooled and 3.83 gm. α-acetoxy-β,β-dimethyl-γ-butyrolactone are added with an additional 10 cc. absolute methyl alcohol. The solution is allowed to stand for 42 hours. Methanol is distilled in vacuum at 35°, the residue is dissolved in 30 cc. alcohol and the solution is allowed to stand for 3 hours so that any uncombined β-alanine might settle out. The solution is filtered with decolorizing carbon, such as Norite Supra. The alcohol is again distilled in vacuum, the residue re-dissolved in alcohol and again filtered. The process is repeated 3 times. Acetone is then added with cooling and vigorous stirring. A white product precipitates out. The mother liquor is decanted and the product washed with acetone and ether. Colorless needles are obtained which are dried over calcium chloride in high vacuum. The product is very hygroscopic and melts at 121°–122° C.

```
Found_____ C=44.82%   H=6.85%
Calc _____ C=44.8%    H=6.63%
Calc. for sodium acetylpantothenate___ C=46.62%   H=6.41%
```

In a similar manner, using d-α-acetoxy-β,β-dimethyl-γ-butyrolactone (described in Example 3) sodium-l-pantothenate is obtained showing $(\alpha)_D^{12.5}$ 29.5±1.5 (C=1.9 in $H_2O$).

Example 2

α-Benzoxy-β,β-dimethyl-γ-butyrolactone is prepared as follows: 14 gm. benzoyl chloride are added to a solution of 14.2 gm. (excess) α-hydroxy-β,β-dimethyl-γ-butyrolactone dissolved in 25 cc. absolute pyridine. The mixture is heated on the water bath for 1 hour, then poured into 250 cc. water. The oil which separates is taken off, dissolved in ether and dried over sodium sulfate. After distilling the ether, the residue distills in vacuum, B. P. 198–203 at 12 mm. The compound comes over as a light yellow oil which crystallizes on standing and scratching. Yield 16 gm. It can be recrystallized from 50/50 aqueous alcohol. M. P. 63–64.5°. Dried for 14 hours over sulfuric acid at room temperature and 6 hours at 35° over calcium chloride.

```
Calc. for C₁₃H₁₄O₄_____ C=66.63;  H=6.03
Found_____ C=67.00;  H=5.89
```

1.5 gms. of β-alanine (1 mol) are dissolved in 8.2 cc. 2.05 n methyl-alcoholic sodium methylate, and to this are added 3.95 gms. (1 mol) of α-benzoxy-β,β-dimethyl-γ-butyrolactone. The solution is allowed to stand for two days, the alcohol removed, and the residue is taken up in ethylalcohol and chilled to remove slight amounts of uncombined β-alanine. After filtration, the ethanol is distilled off in vacuum and the product again taken up in 30 cc. ethanol, chilled, and filtered. To the filtrate acetone is added with cooling and stirring, and colorless crystals separate out which are washed with acetone and ether. These melt at 121–122° C. and are identical to material obtained in Example 1.

Example 3

1.98 gms. of β-alanine are dissolved in 11.1 cc. of 2 n aqueous sodium hydroxide solution. To the solution 3.83 gms. of d-α-acetoxy-β,β-dimethyl-γ-butyrolactone (obtained by acetylation of d-α-hydroxy-β,β-dimethyl butyrolactone with acetic anhydride) are added and sufficient methanol to produce a homogeneous solution. After standing for two days, the methanol and water are distilled off in vacuum at 35° C., and the product is repeatedly taken up in ethylalcohol, chilled, filtered, and the alcohol removed until no β-alanine separates out. When the alcoholic solution yields no more β-alanine, acetone is added with cooling and stirring and the product worked up as in Example 1. This yields sodium-l-pantothenate as described in Example 1.

Example 4

1.15 grams of β-alanine are dissolved in 16.8 cc. of 1.0 n sodium-hydroxide solution and to this 3.95 grams of α-benzoyl-β,β-dimethyl-γ-butyrolactone are added. Sufficient methanol is added to bring the crystals into solution. The solution is allowed to stand for 2 days. The water is distilled in a vacuum at 25° C.; the residue taken up in 30 cc. of alcohol and stood over night; and the solution is filtered from unchanged β-alanine through a thin layer of decolorizing carbon. The alcohol is distilled off in a vacuum; the residue redissolved in alcohol and again filtered after standing. This operation is repeated several

```
Na=9.19%   Acetyl=0.1%
Na=9.54%   Acetyl=0.0%
Na=8.12%   Acetyl=15.2%
``` times until no further deposit of crystalline material from the alcoholic solution occurs. With vigorous stirring, acetone is then added to the alcohol solution, and the crystalline product separated, removed, and washed with acetone and then with ether. White hydroscopic needles, similar in every respect to the product of Example 1, are obtained.

The products as obtained in the above example were tested by the method of R. J. Williams, D. Pennington, and D. E. Snell, J. Biol. Chem. 135: 213 (1940). Solutions of (1) sodium-d,l-pantothenate prepared according to Example 1. (2) Sodium-d,l-pantothenate prepared by the hydrolysis of sodium-d,l-α-acetyl-pantothenate prepared as previously described were made into a solution such that 1 cc.=1 γ of the crystalline substance. (3) Sodium-d,l-acetyl-pantothenate prepared so that 1 cc. of the solution=0.118 γ of the solid substance. (4) Calcium-d-pantothenate obtained commercially prepared in the solution so that 1 cc.=0.1γ.

To the cultures of *Lactobacillus caseii* prepared according to the method of the above reference, different amounts of the above respective solutions were added and placed in an incubator for 24 hours at 37° C. and then examined for growth. The results obtained are shown in the following table:

| Cc. of solution added to tube | Sodium d,l-pantothenate | Sodium d,l-pantothenate by hydrolysis of sodium d,l-acetyl pantothenate | Sodium d,l-acetyl pantothenate | Calcium d-pantothenate | Control no pantothenic acid |
|---|---|---|---|---|---|
| 0.02 |   |   |   |   |   |
| 0.05 | + | + |   | + | + |
| 0.1  | + | + |   | + | + |
| 0.2  | + | + |   | ++ | + |
| 0.3  | ++ | ++ |   | +++ | + |
| 0.4  | +++ | +++ |   | +++ | ++ |
| 0.6  | ++++ | ++++ | + | ++++ | ++ |
| 0.7  | ++++ | ++++ | + | ++++ | ++ |

Since sodium-l-pantothenate has no growth-promoting activity, the table indicates that sodium-d,l-pantothenate obtained by the new process is comparable to the calcium-d-pantothenate obtained by other methods. Sodium-d,l-α-acetyl-pantothenate is shown to be inactive, but the product obtained by hydrolysis, namely, sodium-d,l-pantothenate, is shown to be fully active.

What we claim is:

1. Process for the manufacture of an alkali metal salt of pantothenic acid which comprises preparing a solution of an alkali metal salt of β-alanine in a hydroxylated solvent selected from the group consisting of water and lower aliphatic alcohols, reacting the salt in solution with a substantially equimolecular amount of α-acyloxy-β,β-dimethyl-gamma-butyrolactone, and isolating directly from the solution without further chemical intervention the alkali metal salt of pantothenic acid.

2. Process for the manufacture of an alkali metal salt of pantothenic acid which comprises preparing a solution of an alkali metal salt of β-alanine in a hydroxylated solvent selected from the group consisting of water and lower aliphatic alcohols, reacting the salt in solution with a substantially equimolecular amount of α-acetoxy-β,β-dimethyl-gamma-butyrolactone, and isolating directly from the solution without further chemical intervention the alkali metal salt of pantothenic acid.

3. Process for the manufacture of the sodium salt of pantothenic acid which comprises preparing a solution of the sodium salt of β-alanine in a hydroxylated solvent selected from the group consisting of water and lower aliphatic alcohols, reacting the salt in solution with a substantially equimolecular amount of α-acetoxy-β,β-dimethyl-gamma-butyrolactone, and isolating directly from the solution without further chemical intervention the sodium salt of pantothenic acid.

4. Process for the manufacture of an alkali metal salt of pantothenic acid which comprises preparing a solution of an alkali metal salt of β-alanine in a hydroxylated solvent selected from the group consisting of water and lower aliphatic alcohols, reacting the salt in solution with a substantially equimolecular amount of α-benzoxy-β,β-dimethyl-gamma-butyrolactone, and isolating directly from the solution without further chemical intervention the alkali metal salt of pantothenic acid.

5. Process for the manufacture of the sodium salt of pantothenic acid which comprises preparing a solution of the sodium salt of β-alanine in methyl alcohol, reacting the salt in solution with a substantially equimolecular amount of α-benzoxy-β,β-dimethyl-gamma-butyrolactone, and isolating directly from the solution without further chemical intervention the sodium salt of pantothenic acid.

JOHN LEE.
STEPHEN D. HEINEMAN.